(No Model.)
R. E. POINDEXTER.
CROSSCUT SAW.
No. 551,144.　　　　　　　　　　Patented Dec. 10, 1895.
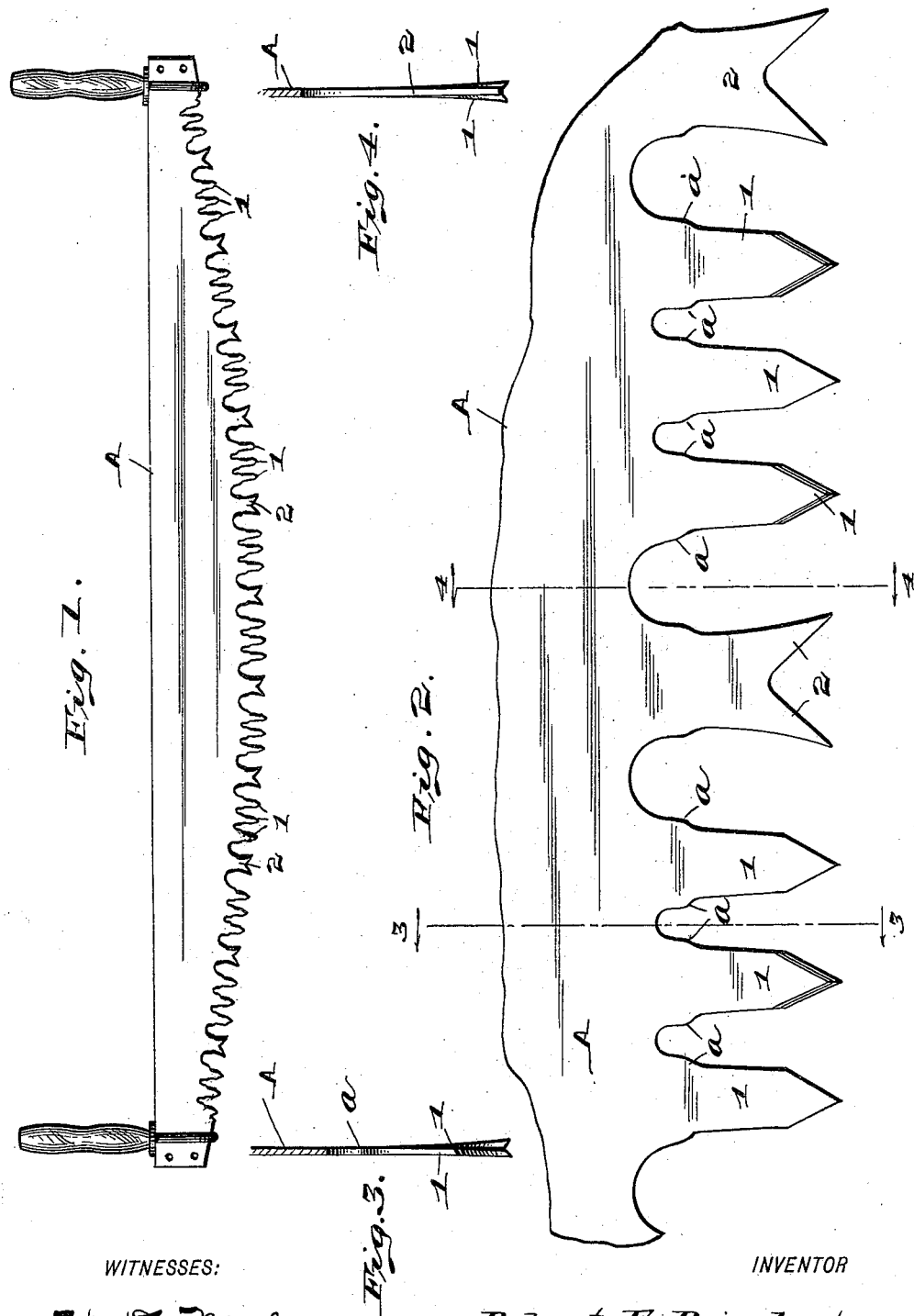
WITNESSES:　　　　　　　　　　　　　　　　INVENTOR
　　　　　　　　　　　　　　　　Robert E. Poindexter,
　　　　　　　　　　　　　　BY
　　　　　　　　　　　　　Chester Bradford,
　　　　　　　　　　　　　　　　　　ATTORNEY.

UNITED STATES PATENT OFFICE.

ROBERT E. POINDEXTER, OF INDIANAPOLIS, INDIANA, ASSIGNOR TO THE E. C. ATKINS & COMPANY, OF SAME PLACE.

CROSSCUT-SAW.

SPECIFICATION forming part of Letters Patent No. 551,144, dated December 10, 1895.

Application filed April 23, 1895. Serial No. 546,861. (No model.)

*To all whom it may concern:*

Be it known that I, ROBERT E. POINDEXTER, a citizen of the United States, residing at Indianapolis, in the county of Marion and State of Indiana, have invented certain new and useful Improvements in Crosscut-Saws, of which the following is a specification.

My said invention relates to crosscut-saws; and it consists in certain improvements in the form of the teeth, whereby efficiency of operation is improved, as will be hereinafter more particularly described and claimed.

Referring to the accompanying drawings, which are made a part hereof and on which similar letters of reference indicate similar parts, Figure 1 is a side elevation of a crosscut-saw provided with teeth embodying my said invention; Fig. 2, a fragmentary view thereof on an enlarged scale; and Figs. 3 and 4, transverse sectional views, as seen when looking in the direction of arrows from the dotted lines 3 3 and 4 4, respectively, in Fig. 2.

The saw-blade A is provided with cutting-teeth 1, and clearing-teeth 2, as is usual; but said teeth are of a somewhat peculiar form. Near the bases of the cutting-teeth 1 are shoulders a, as shown, which serve as chip-breakers, and the raking sides of the clearing-teeth 2 are "cut under" or hollowed out somewhat, also, as shown, which provides larger "throats" to receive the chips. The chip-breaking points a are of considerable advantage in a crosscut-saw, as they insure that no long tenacious chips shall be formed. The clearing-teeth 2 are slightly shorter than the cutting-teeth 1, as is usual, and they are also provided with the chip-breaking points or shoulders opposite the corresponding shoulders on the cutting-teeth, as shown.

As will be readily seen, aside from the peculiar form of the teeth, the saw is of a well-known form, such as is in common use, being made up of cutting and clearing teeth, the main portions of which taper but slightly from their juncture with the saw-blade to the point where the cutting-points are formed. In other words, the general direction of the sides or edges of said teeth is at right angles, or substantially at right angles, with the longitudinal line of the saw, and the sharp angles forming the cutting-points extend back only a portion of their length. Deep recesses are thus formed between adjacent teeth in saws of this form, the walls whereof are parallel or substantially parallel. This invention, therefore, relates particularly to this class of saws, and, as will be readily seen, constitutes a decided improvement thereon, in that not only are the chip-breakers formed to perform the function already described, but the cutting away of the sides of the teeth in the form shown and described affords a very considerable increase in the room or space between the teeth, with the consequent well-known advantage, without materially impairing their rigidity or weakening them.

Having thus fully described my said invention, what I claim as new, and desire to secure by Letters Patent, is—

1. A cross-cut saw formed with cutting and clearing teeth arranged substantially as shown, the main portions of which teeth are formed with edges of but slight angle or taper, the cutting points formed with sharp angles being formed to extend back only a portion of the length of said cutting teeth, the spaces between the adjacent teeth being enlarged by cutting out a portion thereof from the cutting points back to a point near their bases and there forming shoulders or "chip-breakers," substantially as shown and described.

2. A cross-cut saw composed of teeth with cutting points occupying but a portion of their length, the adjacent edges of the main portions of which are cut under back to a point near their bases, where projecting shoulders or "chip-breakers" are formed, substantially as set forth.

In witness whereof I have hereunto set my hand and seal, at Indianapolis, Indiana, this 13th day of April, A. D. 1895.

ROBERT E. POINDEXTER. [L. S.]

Witnesses:
 CHESTER BRADFORD,
 JAMES A. WALSH.